(12) United States Patent
Kishi

(10) Patent No.: US 11,661,070 B2
(45) Date of Patent: May 30, 2023

(54) DRIVING CONSCIOUSNESS ESTIMATION DEVICE

(71) Applicant: TOYOTA JIDOSHA KABUSHIKI KAISHA, Toyota (JP)

(72) Inventor: Hiroshi Kishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 17/073,646

(22) Filed: Oct. 19, 2020

(65) Prior Publication Data

US 2021/0179113 A1 Jun. 17, 2021

(30) Foreign Application Priority Data

Dec. 11, 2019 (JP) .............................. JP2019-223994

(51) Int. Cl.
*B60W 40/09* (2012.01)
*B60W 50/14* (2020.01)
*B60W 30/08* (2012.01)

(52) U.S. Cl.
CPC ............ *B60W 40/09* (2013.01); *B60W 30/08* (2013.01); *B60W 50/14* (2013.01)

(58) Field of Classification Search
CPC .... G05D 1/0061; G05D 1/0088; B60W 40/09
See application file for complete search history.

(56) References Cited

U.S. PATENT DOCUMENTS

| | | | | |
|---|---|---|---|---|
| 6,236,868 B1 * | 5/2001 | Lygas | ................. | H04M 1/6075 |
| | | | | 379/446 |
| 9,731,727 B2 * | 8/2017 | Heim | .................... | B60W 30/09 |
| 10,246,014 B2 * | 4/2019 | Levkova | ................ | G06V 40/18 |
| 2016/0355192 A1 * | 12/2016 | James | ..................... | B60R 11/04 |
| 2016/0378112 A1 * | 12/2016 | Ljubuncic | ............. | B60W 30/16 |
| | | | | 701/45 |
| 2017/0021837 A1 * | 1/2017 | Ebina | .................... | B60W 40/08 |
| 2017/0261974 A1 * | 9/2017 | Ebe | ........................ | B60W 30/14 |
| 2017/0313319 A1 | 11/2017 | Kishi et al. | | |
| 2018/0126901 A1 * | 5/2018 | Levkova | ............... | B60W 40/09 |
| 2018/0354523 A1 | 12/2018 | Kishi et al. | | |
| 2020/0019163 A1 | 1/2020 | Horii et al. | | |
| 2020/0047765 A1 * | 2/2020 | Kishi | ....................... | A61B 5/18 |
| 2020/0073379 A1 * | 3/2020 | Elkins | .................. | B60W 50/14 |

FOREIGN PATENT DOCUMENTS

| | | |
|---|---|---|
| JP | 2005-186674 A | 7/2005 |
| JP | 2012-008790 A | 1/2012 |
| JP | 2017199279 A | 11/2017 |
| JP | 2018-176913 A | 11/2018 |
| JP | 2018-180689 A | 11/2018 |
| JP | 2018-203169 A | 12/2018 |
| JP | 2020024551 A | 2/2020 |

\* cited by examiner

*Primary Examiner* — Ramsey Refai
(74) *Attorney, Agent, or Firm* — Dickinson Wright, PLLC

(57) ABSTRACT

A driving consciousness estimation device includes a driver state estimation unit configured to estimate a state of a driver of a host vehicle, a manual driving ability estimation unit configured to estimate a manual driving ability of the driver based on at least one of a travel state of the host vehicle, a traveling environment around the host vehicle, and a reaction of the driver, and a driving readiness calculation unit configured to calculate a driving readiness relating to a driving consciousness of the driver based on the state of the driver and the manual driving ability of the driver.

12 Claims, 9 Drawing Sheets

| TASK DEMAND ESTIMATION FACTOR | | DETERMINE TASK DEMAND |
|---|---|---|
| DURING FOLLOW-UP TRAVELING (a) | DURING CURVE DRIVING (b) | |
| INTER-VEHICLE TIME WITH PRECEDING VEHICLE IS EQUAL TO OR LONGER THAN ONE SECOND | LATERAL ACCELERATION IS EXPECTED TO BE LOWER THAN 2M/S$^2$ FROM CURRENT VEHICLE SPEED | • DETERMINE TASK DEMAND AS "L" IF BOTH TASK DEMAND ESTIMATION FACTORS (a) AND (b) ARE APPLICABLE<br>• DETERMINE TASK DEMAND AS "M" IF ANY ONE OF TASK DEMAND ESTIMATION FACTORS (a) AND (b) IS APPLICABLE<br>• DETERMINE TASK DEMAND AS "H" IF BOTH TASK DEMAND ESTIMATION FACTORS (a) AND (b) ARE NOT APPLICABLE |

Fig.2

|  | | INTER-VEHICLE TIME WITH PRECEDING VEHICLE |
| --- | --- | --- |
|  | | ONE SECOND |
| INATTENTION TIME PER ONE TIME | SHORTER THAN ONE SECOND | HIGH |
|  | LONGER THAN ONE SECOND | LOW |

Fig.5

| TASK DEMAND ESTIMATION FACTOR | | DETERMINE TASK DEMAND |
|---|---|---|
| DURING FOLLOW-UP TRAVELING (a) | DURING CURVE DRIVING (b) | |
| INTER-VEHICLE TIME WITH PRECEDING VEHICLE IS EQUAL TO OR LONGER THAN ONE SECOND | LATERAL ACCELERATION IS EXPECTED TO BE LOWER THAN 2M/S² FROM CURRENT VEHICLE SPEED | • DETERMINE TASK DEMAND AS "L" IF BOTH TASK DEMAND ESTIMATION FACTORS (a) AND (b) ARE APPLICABLE<br>• DETERMINE TASK DEMAND AS "M" IF ANY ONE OF TASK DEMAND ESTIMATION FACTORS (a) AND (b) IS APPLICABLE<br>• DETERMINE TASK DEMAND AS "H" IF BOTH TASK DEMAND ESTIMATION FACTORS (a) AND (b) ARE NOT APPLICABLE |

DRIVING CONSCIOUSNESS ESTIMATION DEVICE

TECHNICAL FIELD

The present disclosure relates to a driving consciousness estimation device.

BACKGROUND

A device disclosed in Japanese Unexamined Patent Publication No. 2017-199279 is known as a technology relating to a driving consciousness estimation device. In the driving consciousness estimation device disclosed in Japanese Unexamined Patent Publication No. 2017-199279, a driving readiness relating to a driver's driving consciousness is calculated based on an image of a driver of a vehicle.

SUMMARY

Incidentally, the driving readiness has individual differences due to, for example, a manual driving ability of a driver. In addition, the driving readiness varies within a day even for one driver, depending on a condition relating to the manual driving ability (intelligence of a head, fatigue of the hands, and the like). However, in the driving consciousness estimation device described above, in some cases, such characteristics of the driving readiness are not sufficiently taken into consideration, and thus, it is difficult to calculate the driving readiness with high accuracy.

An aspect of the present disclosure is to provide a driving consciousness estimation device that can calculate the driving readiness with high accuracy.

A driving consciousness estimation device according to an aspect of the present disclosure includes: a driver state estimation unit configured to estimate a state of a driver of a host vehicle; a manual driving ability estimation unit configured to estimate a manual driving ability of the driver based on at least one of a travel state of the host vehicle, a traveling environment around the host vehicle, and a reaction of the driver; and a driving readiness calculation unit configured to calculate a driving readiness relating to a driving consciousness of the driver based on the state of the driver and the manual driving ability of the driver.

In this driving consciousness estimation device, since the driving readiness is calculated based on the manual driving ability of the driver, compared to the related art, for example, the driving readiness can be calculated while taking the individual differences of driver and the variations within a day into consideration. Therefore, the driving readiness can be calculated with high accuracy.

In an embodiment, the manual driving ability estimation unit may be configured to estimate the manual driving ability particularly based on a driver's lateral side visual recognition time when changing lanes or entering a merging point. In this case, the driving readiness can be calculated based on the spatial cognitive ability among the manual driving abilities of the driver.

In an embodiment, the manual driving ability estimation unit may be configured to estimate the manual driving ability when another vehicle is not present within a predetermined range around the host vehicle. As a result, it is possible to prevent the erroneous estimation of the manual driving ability, which is caused by the extension of the lateral side visual recognition time due to the presence of another vehicle.

In an embodiment, the manual driving ability estimation unit may be configured to estimate the manual driving ability based on a distance from a preceding vehicle and a driver's inattention time during follow-up traveling. In this case, the driving readiness can be calculated particularly based on the spatial attention ability among the driver's manual driving abilities.

In an embodiment, the manual driving ability estimation unit may be configured to estimate the manual driving ability based on a position of a line of sight of the driver when entering a curve. In this case, the driving readiness can be calculated particularly based on the action planning ability among the manual driving abilities of the driver.

In an embodiment, the manual driving ability estimation unit may be configured to estimate the manual driving ability based on a steering amount and a vehicle speed of the host vehicle when passing a lateral side of a obstacle. In this case, the driving readiness can be calculated particularly based on the determination ability (action selection ability) among the manual driving abilities of the driver.

In an embodiment, the manual driving ability estimation unit may be configured to estimate the manual driving ability based on a maximum acceleration and a maximum jerk of the host vehicle when curve driving or braking. In this case, the driving readiness can be calculated particularly based on the operation ability among the manual driving abilities of the driver.

In an embodiment, the driving consciousness estimation device may further include a task demand estimation unit configured to estimate a task demand, which is an indicator required for the driver of the host vehicle; and a manual driving suitability determination unit configured to determine whether a driver's preparation for switching to the manual driving is suitable or not based on the task demand and the driving readiness. As a result, it is possible to determine whether the preparation for switching to manual driving is suitable or not with high accuracy by using the task demand and the driving readiness.

In an embodiment, the driving consciousness estimation device may further include a stimulus applying unit configured to apply a stimulus to the driver when it is determined that the preparation for switching to the manual driving is not suitable by the manual driving suitability determination unit. As a result, when it is determined that the driver's preparation for switching to manual driving is not suitable, it is possible to encourage the driver to increase the driving readiness.

In an embodiment, the driving consciousness estimation device may further include a display unit configured to display a result of the determination performed by the manual driving suitability determination unit. As a result, it is possible to feed back the result of determination of the suitability for the preparation for switching to the manual driving to the driver or the like.

In an embodiment, the manual driving ability estimation unit may be configured to estimate the manual driving ability during the manual driving of the host vehicle. As a result, it is possible to estimate the manual driving ability with high accuracy.

In an embodiment, the driver state estimation unit may be configured to estimate the state of the driver and the driving readiness calculation unit may be configured to calculate the driving readiness during an autonomous driving of the host vehicle. As a result, the state of the driver and the driving readiness obtained during the autonomous driving can be used for determining whether the preparation for switching to manual driving is suitable or not, which is continued from the autonomous driving.

According to various aspects or the embodiment of the present disclosure, it is possible to provide a driving consciousness estimation device that can calculate the driving readiness with high accuracy.

BRIEF DESCRIPTION OF THE DRAWINGS

FIG. 2 is a table for explaining an estimation of spatial attention ability by a manual driving ability estimation unit in FIG. 1.

FIG. 5 is a table for explaining an example of a task demand determination.

DETAILED DESCRIPTION

Figure 1:
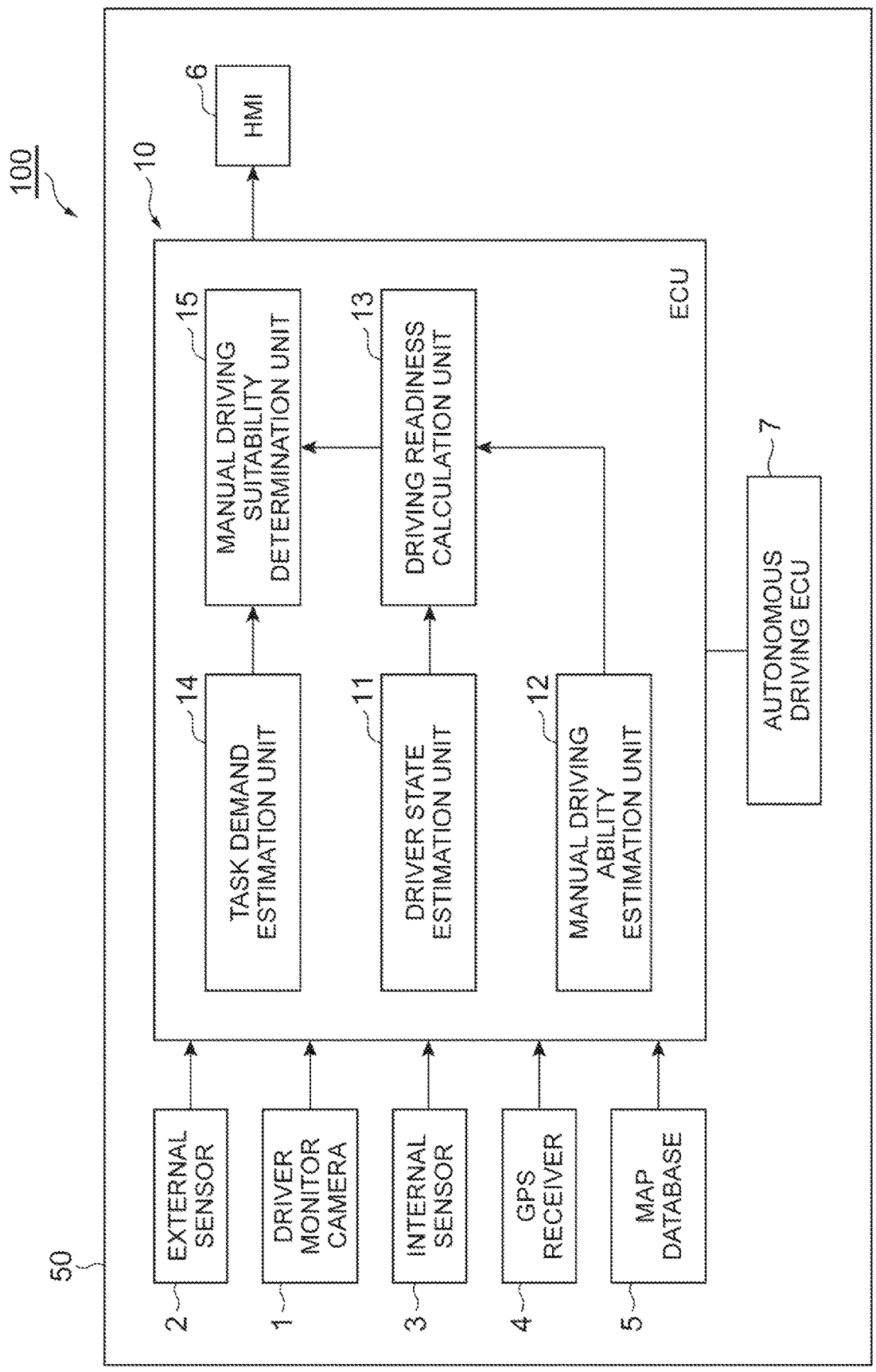
FIG. 1 is a block diagram illustrating a driving consciousness estimation device according to an embodiment.

Hereinafter, an embodiment will be described with reference to the drawings. In the description below, the same reference numerals are used for the same or equivalent elements, and redundant explanations will not be repeated.

As illustrated in FIG. 1, a driving consciousness estimation device 100 includes an electronic control unit (ECU) 10 that performs an overall management of the device. The ECU 10 is an electronic control unit including a central processing unit (CPU), read only memory (ROM), random access memory (RAM) and the like. In the ECU 10, various functions are realized by a program stored in the ROM being loaded on the RAM and the CPU executing the program loaded on the RAM. The ECU 10 may be configured to include a plurality of electronic control units.

A driver monitor camera 1, an external sensor 2, an internal sensor 3, a global positioning system (GPS) receiver 4, a map database 5, and an HMI 6 are connected to the ECU 10. The ECU 10 is connected to an autonomous driving ECU 7.

The driver monitor camera 1 is provided on a cover of a steering column of the host vehicle 50 of an automobile or the like and at a position in front of a driver (hereinafter, also simply referred to as a "driver") of the host vehicle 50, and images a head of a driver. Since the driver monitor camera 1 images the driver from plural directions, plural number of cameras may be provided. The driver monitor camera 1 transmits a driver image in which the driver is imaged to the ECU 10.

The external sensor 2 is a detection device that detects a surrounding environment of the host vehicle 50. The external sensor 2 includes a camera and a radar sensor. The camera is provided, for example, on the inner side of windshield of the host vehicle 50 and images the front of the host vehicle 50. The camera may be provided on the rear surface or the side surface of the host vehicle 50. The camera transmits image information relating to surroundings of the host vehicle 50 to the ECU 10. The camera may be a monocular camera or may be a stereo camera. The stereo camera has two imaging units that are arranged so as to reproduce a binocular parallax.

The radar sensor is a detection device that detects obstacles around the host vehicle 50 using radio waves (for example, millimeter waves) or light. The radar sensor includes, for example, millimeter wave radar or a light detection and ranging (LIDAR). The radar sensor transmits the radio wave or light to the surroundings of the host vehicle 50, and detects the obstacles by receiving radio waves or light reflected from obstacles. The radar sensor transmits the detected obstacle information to the ECU 10.

The internal sensor 3 is a detection device that detects a travel state of the host vehicle 50. The internal sensor 3 includes a vehicle speed sensor, an acceleration sensor, and a yaw rate sensor. The vehicle speed sensor is a measuring device that measures a speed of the host vehicle 50. As the vehicle speed sensor, for example, a vehicle wheel speed sensor is used, which is provided on vehicle wheels of the host vehicle 50 or on a drive shaft rotating integrally with vehicle wheels, and measures a rotational speed of the vehicle wheels. The vehicle speed sensor transmits the measured vehicle speed information (vehicle wheel speed information) to the ECU 10.

The acceleration sensor is a measuring device that measures an acceleration of the host vehicle 50. The acceleration sensor includes, for example, a longitudinal acceleration sensor that measures acceleration in the longitudinal direction of the host vehicle 50 and a lateral acceleration sensor that measures a lateral acceleration of the host vehicle 50. The acceleration sensor transmits, for example, acceleration information of the host vehicle 50 to the ECU 10. The yaw rate sensor is a measuring device that measures a yaw rate (rotation angular velocity) around the vertical axis at the center of gravity of the host vehicle 50. As the yaw rate sensor, for example, a Gyro sensor can be used. The yaw rate sensor transmits the measured yaw rate information of the host vehicle 50 to the ECU 10.

The GPS receiver 4 measures the position of the host vehicle 50 (for example, the latitude and longitude of the host vehicle 50) by receiving signals from three or more GPS satellites. The GPS receiver 4 transmits the measured position information on the host vehicle 50 to the ECU 10. The driving consciousness estimation device 100 may acquire the position information on the host vehicle 50 using a simultaneous localization and mapping (SLAM) technology which uses the result of detection performed by the external sensor 2 and map information, instead of the GPS.

The map database 5 is a database storing the map information. The map database 5 is formed, for example, in a hard disk drive (HDD) mounted on the host vehicle 50. The map information includes information on the position of the road, information on the shape of the road (for example, types of curves or straight roads, a curvature of the curve, or the like), information on the width of the road, information on the height of the road, information on the position of the intersection, merging point, and the branch, and information on the position of a building. The map information may include position information relating to an installed object on the road such as a guide plate, a sign, or the like. The map database 5 may be stored in a computer in a facility such as a management center that can communicate with the host vehicle.

The HMI 6 is an interface that performs inputting and outputting of the information between the driving consciousness estimation device 100 and the driver. The HMI 6 includes, for example, a display unit (display) and a speaker of the host vehicle 50. The HMI 6 outputs an image on the display and outputs a voice from the speaker according to a control signal from the ECU 10. The HMI 6 may include a head up display (HUD).

The autonomous driving ECU 7 is an electronic control unit that is mounted on the host vehicle 50 and executes an autonomous driving of the host vehicle 50. The autonomous driving means a vehicle control causing the host vehicle 50 to travel autonomously without the driving operation by the driver. The autonomous driving ECU 7 generates a travel plan along a preset target route based on the position information of the host vehicle 50 from the GPS receiver 4, the map information in the map database 5, and a traveling environment and the travel state of the host vehicle 50 described below. The target route here is set by a navigation system. The autonomous driving ECU 7 executes the autonomous driving according to the travel plan. The autonomous driving ECU 7 executes the autonomous driving by transmitting the control signal to an actuator (an engine actuator, a steering actuator, a brake actuator, or the like) of the host vehicle 50. The autonomous driving ECU 7 generates the travel plan using a known method and executes the autonomous driving. The autonomous driving ECU 7 may perform a travel control to make the vehicle follow the preceding vehicle and cause the host vehicle 50 to autonomously drive so as to follow the preceding vehicle.

During the execution of the autonomous driving, for example, when the override operation is performed, the autonomous driving ECU 7 releases the execution of autonomous driving and shifts a driving mode to a manual driving (that is, switches the driving of the host vehicle 50 to the manual driving from the autonomous driving). The override operation is an intervention operation by the driver for shifting the driving mode of the host vehicle 50 from the autonomous driving to the manual driving. The autonomous driving ECU 7 shifts the driving mode to the manual driving by gradually decreasing a control command value to the actuator of the host vehicle 50 down to zero. The manual driving also includes a case where a well-known driving support control that supports the driving operation is executed.

Next, a functional configuration of the ECU 10 will be described.

The ECU 10 includes a driver state estimation unit 11, a manual driving ability estimation unit 12, a driving readiness calculation unit 13, a task demand estimation unit 14 and a manual driving suitability determination unit 15. A part of the functions of the ECU 10 may be an aspect of being executed by a computer in the facility such as the management center that can communicate with the host vehicle 50 and/or by the autonomous driving ECU 7. The ECU 10 may be integrated with the autonomous driving ECU 7.

The driver state estimation unit 11 estimates a state of the driver of the host vehicle 50. The driver state estimation unit 11 estimates the state of the driver during autonomous driving of the host vehicle 50. The driver state estimation unit 11 estimates the reaction time (a reaction delay) of the driver as the driver state. The reaction time includes a peripheral vision reaction time and a vehicle behavior reaction time. The driver state estimation unit 11 recognizes the reaction time from the timing when the viewing target is seen by the driver to the timing when the driver visually recognizes the viewing target as the peripheral vision reaction time. The driver state estimation unit 11 recognizes the reaction time from the timing when the viewing target is seen by the driver to the timing when the driver executes the vehicle behavior against the viewing target as the vehicle behavior reaction time. The method of recognizing the reaction time is not particularly limited, and various well-known methods can be adopted.

The viewing target can be detected from the traveling environment around the host vehicle 50. The traveling environment around the host vehicle 50 is recognized based on, for example, at least one of the result of detection by the external sensor 2, the position information from the GPS receiver 4, the map information in the map database 5 and the information relating to the autonomous driving from the autonomous driving ECU 7. The recognition of the traveling environment around the host vehicle 50 can be realized by various known methods. A situation of obstacles around the host vehicle 50 and a road situation are included in the traveling environment. Positions of the obstacle with respect to the host vehicle 50, a relative speed of the obstacle with respect to the host vehicle 50, a moving direction of the obstacle with respect to the host vehicle 50, and the like are included in the situations of the obstacles around the host vehicle 50. The obstacles include fixed obstacles such as guardrails, road installations, buildings, and moving obstacles such as pedestrians, bicycles, and other vehicles. The road situation includes the road shape (curve, intersection, merge section, or the like) in front of the host vehicle 50. The viewing target includes at least one of the obstacle and a road shape. A driver's line of sight can be detected from the driver image (hereinafter, simply referred to as a driver image) obtained by the driver monitor camera 1. The line of sight of the driver can be detected by detecting eyeballs and movements of the eyeballs of the driver from the driver image using a well-known method. The vehicle behavior can be detected from the travel state of the traveling host vehicle 50. The travel state of the traveling host vehicle 50 is recognized based on the result of detection result performed by the internal sensor 3, for example. The travel state includes the vehicle speed of the host vehicle 50, the acceleration of the host vehicle 50, and the yaw rate of the host vehicle 50.

The driver state estimation unit 11 estimates an inattention time, which is a time the inattention of the driver continues, as the state of the driver. The driver state estimation unit 11 recognizes the inattention time based on, for example, the driver image. The method of recognizing the inattention time is not particularly limited, and various well-known methods can be adopted.

The driver state estimation unit 11 estimates a driver's awakening degree as the state of the driver. The driver state estimation unit 11 recognizes the driver's awakening degree based on, for example, the driver image, from the eye-closing rate of the driver per minute, a state of eye opening, a frequency of blinking, or an eye ball movement. The driver state estimation unit 11 may recognize the driver's awakening degree based on the travel state of the host vehicle 50, for example. The awakening degree is a degree indicating that the consciousness of the driver is not in a state of being hazy due to lack of sleep or the like, but in an awakening state. The method of recognizing the awakening degree is not particularly limited, and various well-known methods can be adopted. The awakening degree may be an index including at least one of the steering wheel grip pressure of the driver, the armrest pressing force, heart rate, electromyogram information and electroencephalogram pattern. The steering wheel grip pressure of the driver, the armrest pressing force, heart rate, electromyogram information and electroencephalogram pattern can be acquired using various well known sensors.

The state of the driver estimated by the driver state estimation unit 11 can be divided into three stages of "high", "medium", and "low" in an order from the good state to the bad state, for example. As an example, the driver state estimation unit 11 can divide the state of the driver into three stages as follows.

The driver state estimation unit 11 divides the recognized reaction time into three stages of "high", "medium", and "low" in an order of good state to bad state. Specifically, the reaction time is set to "high" when the reaction time is shorter than or equal to a first reaction time threshold value, and is set to "low" when the reaction time is longer than or equal to a second reaction time threshold value that is greater than the first reaction time threshold value, and in other cases, the reaction time is set to "medium". The driver state estimation unit 11 divides the recognized inattention time into, for example, three stages of "high", "medium", and "low" in an order of good state to bad state. Specifically, the inattention time is set to "high" when the inattention time is shorter than or equal to a first inattention time threshold value, and the inattention time is set to "low" when the inattention time is longer than or equal to a second inattention time threshold value which is greater than the first inattention time threshold value, and in other cases, the inattention time is set to "medium". The driver state estimation unit 11 divides the recognized awakening degree into, for example, three stages of "high", "medium", and "low" in an order of good state to bad state. Specifically, the awakening degree is set to "low" when the awakening degree is lower than or equal to a first awakening degree threshold value, and the awakening degree is set to "high" when the awakening degree is higher than or equal to a second awakening degree threshold value which is greater than the first awakening degree threshold value, and in other cases, the awakening degree is set to "medium". The driver state estimation unit 11 sets the state of the worst stage or the best stage among the states of the reaction time, the inattention time, and the awakening degree, as the state of the driver. Alternatively, the driver state estimation unit 11 sets the state of most existing stage among the states of the reaction time, the inattention time and the awakening degree, as the state of the driver. The way of expressing the state of the driver is not particularly limited and may be expressed by a numerical value or may be divided into a plurality of stages.

The state of the driver is not limited to the description above. The state of the driver may include at least one of the reaction time, the inattention time, and the awakening degree, or may include other states. The state of the driver may include, for example, at least one of a width of the visual field and an eye-closing time rate.

The manual driving ability estimation unit 12 estimates a manual driving ability of the driver based on the travel state of the host vehicle 50, the traveling environment around the host vehicle 50, and/or the reaction of the driver. The manual driving ability is also called a "competence". The manual driving ability is, for example, the driving ability that can be maximized. The reaction of the driver is recognized, for example, based on at least one of the driver image and the result of detection performed by the internal sensor 3. The manual driving ability estimation unit 12 estimates the manual driving ability of the driver during the manual driving of the host vehicle 50. The manual driving ability can be classified into, for example, a spatial attention ability, a spatial cognitive ability, an action planning ability, a determination ability (an action selection ability), and an operation ability.

The spatial attention ability is an ability relating to whether or not an attention can be distributed to the front direction in response to a task demand (for example, when a vehicle-to-vehicle distance is short or the vehicle speed is high, whether or not the inattention is short). The manual driving ability estimation unit 12 estimates the spatial attention ability based on the vehicle-to-vehicle distance to a preceding vehicle and the driver's inattention time during a follow-up driving. For example, the manual driving ability estimation unit 12 extracts a case of a travel scene in which a time head way (THAT) is within 1 second, and calculates an average inattention time per one inattention in that travel scene. If the calculated average inattention time per one inattention is equal to or shorter than 1 second, the spatial attention ability is estimated to be "high", and if the calculated average inattention time per one inattention is longer than one second, the spatial attention ability is estimated to be "low" (for example, refer to FIG. 2).

The spatial cognitive ability is an ability relating to a speed of spatial cognition. The manual driving ability estimation unit 12 estimates the spatial cognitive ability based on the driver's lateral side visual recognition time at the time of lane change (when changing the lane) or when entering a merging point. The manual driving ability estimation unit 12 estimates that the spatial cognitive ability is "high" when the deviation amount of the lateral side visual recognition time from the predetermined time is small, and in other cases, estimates that the manual driving ability is "low".

Figure 3A:
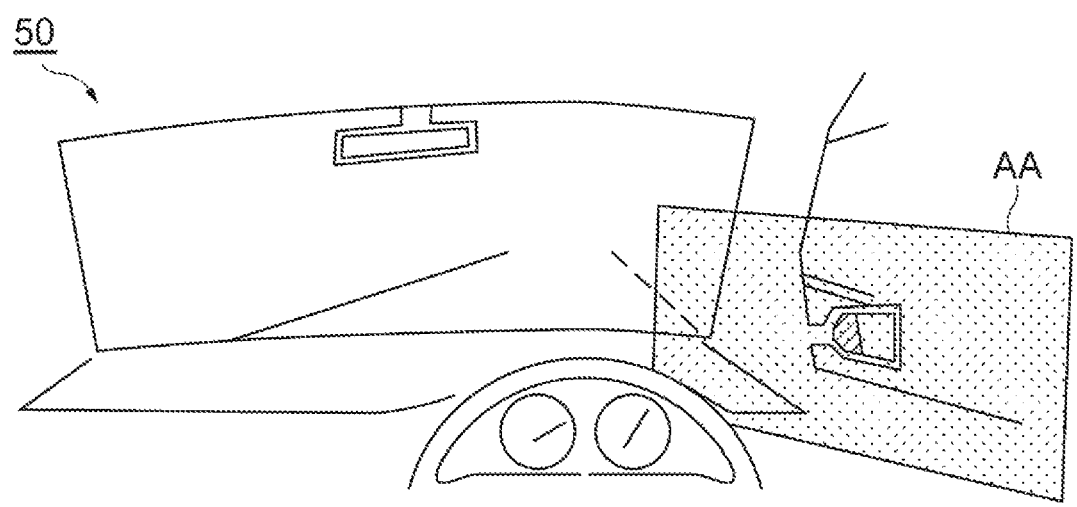
FIG. 3A is a diagram for explaining a line-of-sight area for recording a lateral side visual recognition time.
Figure 3B:
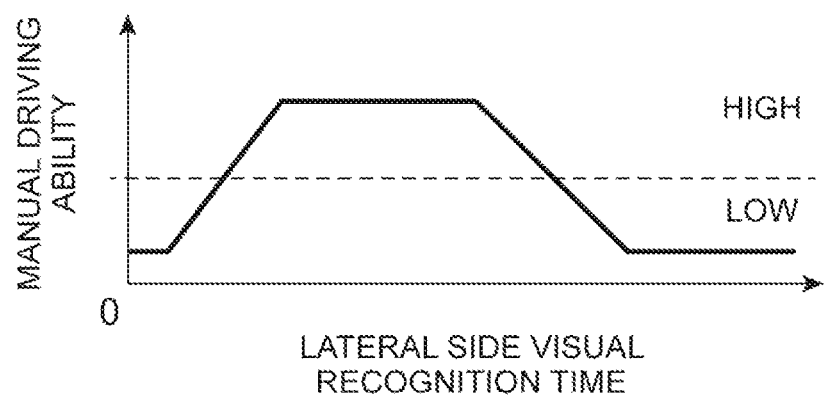
FIG. 3B is a graph for explaining an estimation of a spatial cognitive ability by the manual driving ability estimation unit in FIG. 1.

For example, when it is determined that the host vehicle 50 performed the lane change, the manual driving ability estimation unit 12 records the driver's lateral side visual recognition time. When changing lane to the right lane, the line-of-sight area for recording the lateral side visual recognition time is a rectangular area that is shifted to the right to the front, and is an area AA including a right door mirror (refer to FIG. 3A). The manual driving ability estimation unit 12 estimates a level of the manual driving ability as a spatial cognitive ability based on the recorded lateral side visual recognition time and using the graph illustrated in FIG. 3B. When the lateral side visual recognition time is shorter than a lower limit time $\alpha 1$ and longer than an upper limit time $\alpha 2$, the manual driving ability can be estimated to be "low", and in other cases, the manual driving ability is can be estimated to be "high". The manual driving ability estimation unit 12 may perform such estimation of the manual driving ability when another vehicle is not present within a predetermined range around the host vehicle 50. The predetermined range is a value set in advance, and may be a fixed value or may be a variable value.

The action planning ability is an ability relating to whether a target course can be planned before steering. The action planning ability is an ability relating to whether a feedforward (FF) based driving or a feedback (FB) based driving can be performed. The manual driving ability estimation unit 12 estimates the action planning ability based on a position of the line of sight of the driver when the host vehicle 50 enters the curve. For example, the manual driving ability estimation unit 12 calculates a probability that the driver's line of sight is directed to a Tangent Point (TIP) in a saccade (that is, FF-based driving can be performed) when the host vehicle 50 enters a curve. If the calculated probability is higher than a predetermined value, the action planning ability is estimated to be "high", and in other cases, the action planning ability is estimated to be "low".

The determination ability is an ability relating to whether the action selection based on the operation ability and a risk described below can be performed. The manual driving ability estimation unit 12 estimates the determination ability based on the steering amount and the vehicle speed of the host vehicle 50 at the time of passing the lateral side of an obstacle. For example, when the degree of inverse correlation between amount of the driver's steering disturbance and the vehicle speed of the host vehicle 50 is high at the time of passing the lateral side of the obstacle in which the host vehicle 50 passes the lateral side of the obstacle, the manual driving ability estimation unit 12 estimates that the determination ability is "high", and in other cases, estimates that the determination ability is "low".

The operation ability is an ability relating to the level of disturbance in steering and braking operation. The manual driving ability estimation unit 12 estimates the operation ability based on the maximum acceleration and the maximum jerk of the host vehicle 50 during curve traveling or braking. For example, when the host vehicle 50 enters the curve or at a time of braking, if a value obtained by dividing the maximum jerk of the host vehicle 50 by the maximum acceleration is smaller than a predetermined value, the manual driving ability estimation unit 12 estimates that the operation ability is "high", and in other cases, estimates that the operation ability is "low".

Among the spatial attention ability, the spatial cognitive ability, the action planning ability, the determination ability, and the operation ability, the manual driving ability estimation unit 12 sets the ability having the worst stage or the best stage as the manual driving ability of the driver. Alternatively, among the spatial attention ability, the spatial cognitive ability, the action planning ability, the determination ability, and the operation ability, the manual driving ability estimation unit 12 sets the ability of most existing stage as the manual driving ability of the driver. The method of expressing the manual driving ability is not particularly limited, and may be expressed by a numerical value or may be divided into a plurality of stages.

The driving readiness calculation unit 13 calculates a driving readiness relating to a driving consciousness of the driver based on the state of the driver estimated by the driver state estimation unit 11 and the manual driving ability of the driver estimated by the manual driving ability estimation unit 12. The driving readiness calculation unit 13 calculates the driving readiness at the time of the autonomous driving of the host vehicle 50. The driving readiness is a degree of information processing ability of the driver for driving. The driving readiness is a degree according to a level of the driving consciousness of the driver. The driving consciousness is a generic term for mental activities including cognition, prediction, determination, and an operation when the driver drives a vehicle.

The driving readiness is a level of readiness for the driving by the driver. The driving readiness is also called "readiness". As the driving consciousness and the degree of readiness of the driver against the traveling environment of the host vehicle 50 increase, the value of driving readiness increases. As an example, the driving readiness here can be divided into three stages such as Low (low), Medium (normal), and High (high). The way of expressing the driving readiness is not particularly limited, and may be expressed by a numerical value or may be divided into plural stages.

Figure 4:
FIG. 4 is a diagram illustrating a first table for calculating the driving readiness.

The driving readiness calculation unit 13 can calculate the driving readiness by referring to a first table T1 (refer to FIG. 4). The first table T1 is determined in advance and is stored in, for example, a storage unit (ROM or RAM) of the ECU 10. In the driving readiness in the first table T1 in FIG. 4, "L" represents Low, "M" represents Medium, and "H" represents High (the same applies hereinafter). In the first table T1, when the manual driving ability is "low" and the driver state is "low", the driving readiness is "L", when the manual driving ability is "high" and the driver state is "high", the driving readiness is "H", and in other cases, the driving readiness is "M".

The task demand estimation unit 14 estimates a task demand, which is an index required for the driver of the host vehicle 50. The task demand estimation unit 14 determines whether the task demand is High (high), Medium (normal), or Low (low). The task demand is an ability required after the driving mode of the host vehicle 50 is switched from the autonomous driving to the manual driving. The task demand estimation unit 14 determines the task demand based on the traveling environment around the host vehicle 50 and the travel state of the host vehicle 50.

FIG. 5 is a table for explaining an example of a task demand determination. As illustrated in FIG. 5, the task demand estimation unit 14 sets a fact that a follow-up traveling in which the host vehicle 50 performs a follow-up traveling against the preceding vehicle and an inter-vehicle time with the preceding vehicle which is the inter-vehicle time with the preceding vehicle is equal to or longer than 1.0 second, as a task demand estimation factor (a). The task demand estimation unit 14 sets a fact that the host vehicle 50 is traveling on a curve and the lateral acceleration is expected to be lower than 2 m/s2 from the current vehicle speed, as a task demand estimation factor (b). The task demand estimation unit 14 determines the task demand as "low" if both the task demand estimation factors (a) and (b) are applicable. The task demand estimation unit 14 determines the task demand as "M (Medium)" if any one of the task demand estimation factors (a) and (b) is applicable. The task demand estimation unit 14 determines the task demand as "H (High)" if both the task demand estimation factors (a) and (b) are not applicable.

The manual driving suitability determination unit 15 determines whether the driver's preparation for switching to the manual driving is suitable or not based on the task demand and driving readiness. When the driving readiness is equal to or higher than the task demand, the manual driving suitability determination unit 15 determines that the driver's preparation for switching to the manual driving is suitable. When the driving readiness is lower than the task demand, the manual driving suitability determination unit 15 determines that the driver's preparation for switching to the manual driving is not suitable (not suitable).

Figure 6:
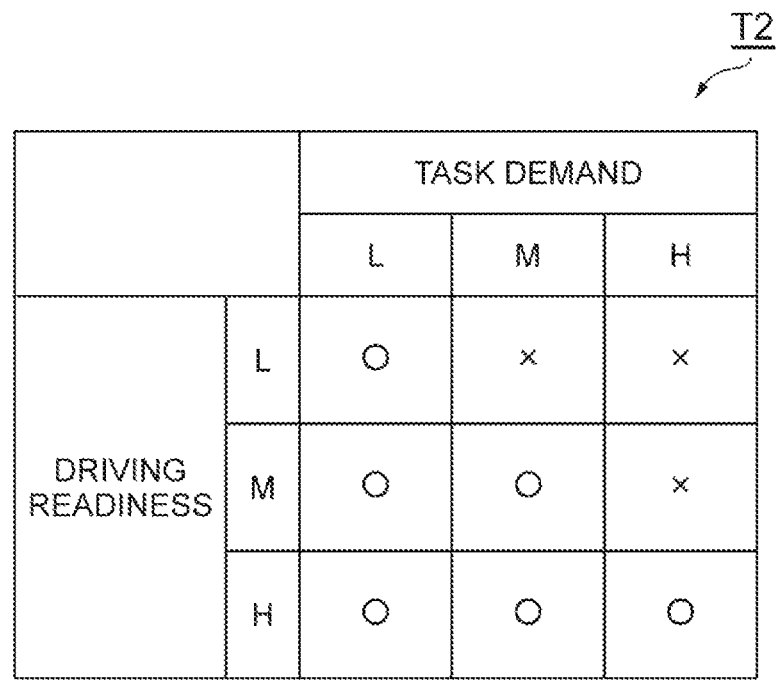
FIG. 6 is a diagram illustrating a second table for determining whether or not the driver's preparation for switching to the manual driving is appropriate.

The manual driving suitability determination unit 15 can calculate the suitability of the manual driving by the driver with reference to the second table T2 (refer to FIG. 6). The second table T2 is determined in advance and is stored in, for example, the storage unit (ROM or RAM) of the ECU 10. In the second table T2 in FIG. 6, "0" indicates that the driver's preparation for switching to the manual driving is suitable, and "X" indicates that the driver's preparation for switching to the manual driving is not suitable. In the second table T2, the manual driving by the driver is "O" when the driving readiness is "H", the manual driving by the driver is "O"

when the driving readiness is "M" and the task demand is "L" or "M", the manual driving by the driver is "O" when the driving readiness is "L" and the task demand is "L", and in other cases, the manual driving by the driver is "X".

Returning to FIG. 1, the HMI 6 applies a stimulus to the driver when it is determined by the manual driving suitability determination unit 15 that the manual driving cannot be performed. When the driver can be stimulated with at least one of vibration and smell, and when it is determined by the manual driving suitability determination unit 15 that the manual driving cannot be performed, the HMI 6 applies the stimulus to the driver such that the driving readiness becomes equal to or higher than the task demand. The HMI 6 displays the result of determination performed by the manual driving suitability determination unit 15. The HMI 6 configures a stimulus applying unit and a display unit.

Next, the processing for the above-described functions of the ECU 10 will be described with reference to an example of starting and ending the autonomous driving during the manual driving of the host vehicle 50.

Figure 7:
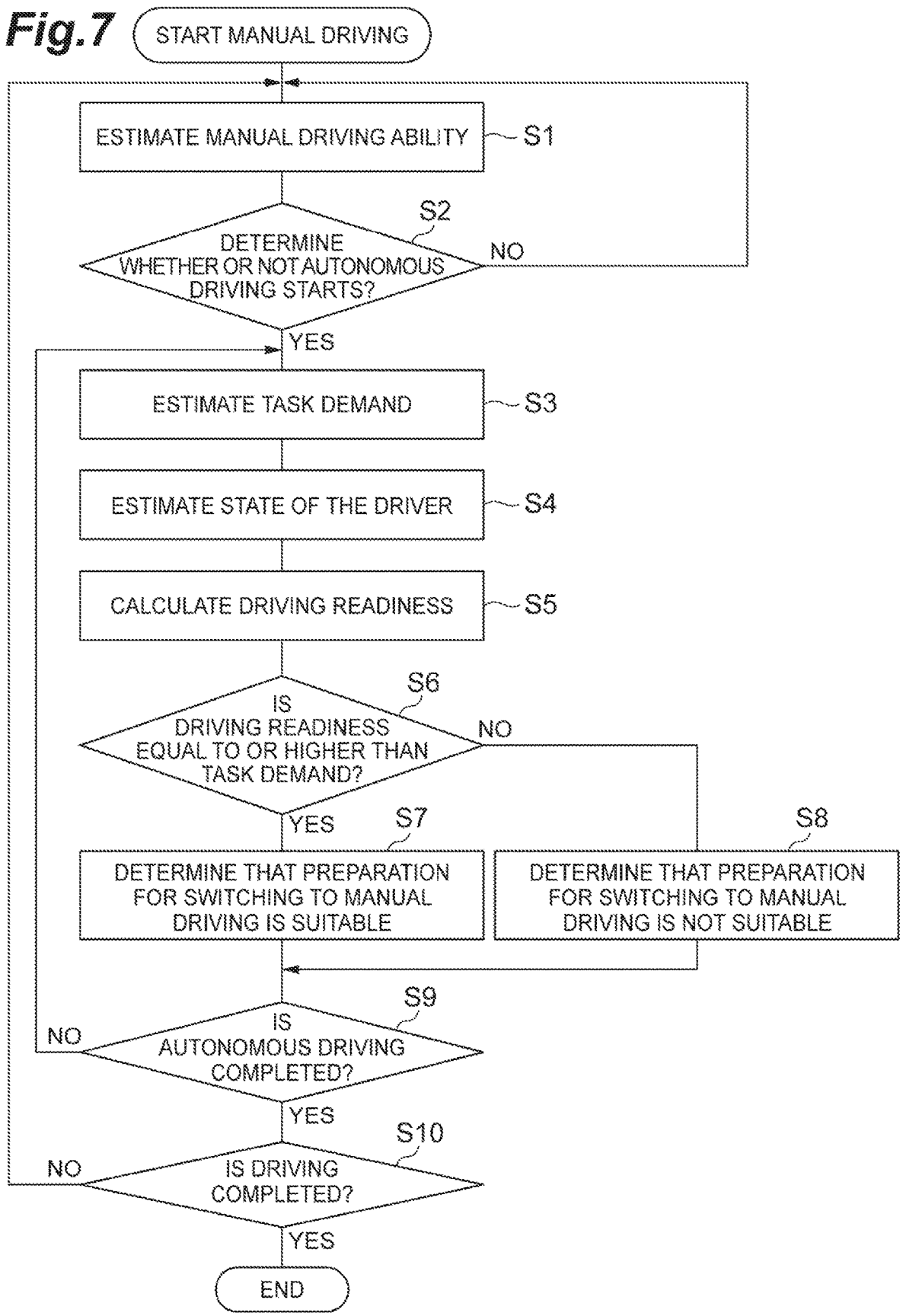
FIG. 7 is a flowchart illustrating an example of processing by an ECU in FIG. 1.

As illustrated in FIG. 7, for example, after the host vehicle 50 is started by the operation of the driver and the manual driving is started, the manual driving ability estimation unit 12 estimates the manual driving ability of the driver (STEP S1). Whether or not the autonomous driving starts is determined (STEP S2). If NO in STEP S2 above, the process returns to STEP S1. If YES in STEP S2 above, the task demand estimation unit 14 estimates the task demand (STEP S3). The driver state estimation unit 11 estimates the state of the driver (STEP S4). The driving readiness degree calculation unit 13 calculates the driving readiness degree (STEP S5).

Subsequently, the manual driving suitability determination unit 15 determines whether or not the driving readiness degree is equal to or higher than the task demand using, for example, the second table T2 (STEP S6). If YES in STEP S6 above, it is determined that the driver's preparation for switching to the manual driving is suitable (STEP S7). In NO in STEP S6 above, it is determined that the driver's preparation for switching to the manual driving is not suitable (STEP S8). Whether or not the autonomous driving is completed is determined (STEP S9). If NO in STEP S9 above, the process returns to STEP S3 above. In YES in STEP S9 above, whether or not the driving of the host vehicle 50 is completed is determined (STEP S10). If NO in S10 above, the process returns to STEP S1 above. If YES in S10 above, the process ends.

Next, a processing example of estimating the manual driving ability performed by the manual driving ability estimation unit 12 (STEP S1 above) will be specifically described.

Figure 8:
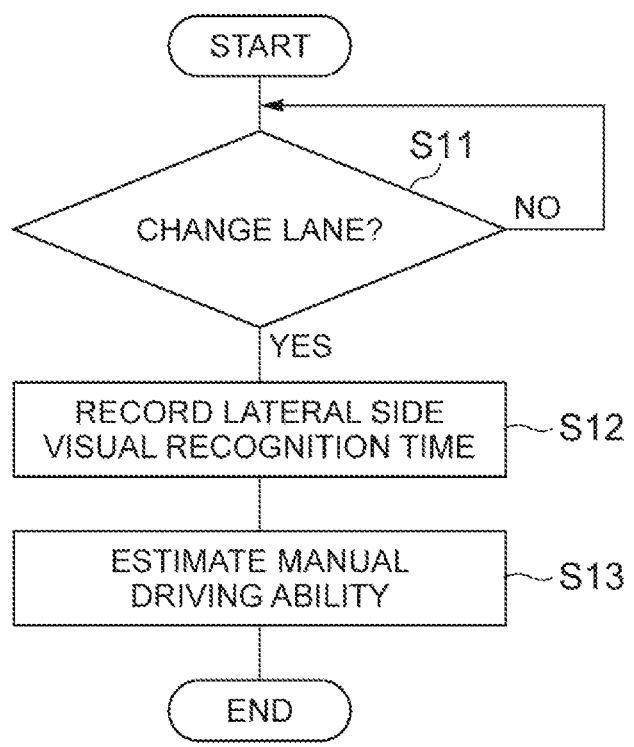
FIG. 8 is a flowchart illustrating an example of processing by the manual driving ability estimation unit in FIG. 1.

As illustrated in FIG. 8, whether or not the host vehicle 50 changes the lane is determined based on the travel state and the traveling environment of the host vehicle 50 (STEP S11). If YES in STEP S11 above, the driver's lateral side visual recognition time is recorded (STEP S12). The manual driving ability is estimated from the recorded lateral side visual recognition time (STEP S13). If NO in STEP S11 above, the process returns to STEP S11.

Figure 9:
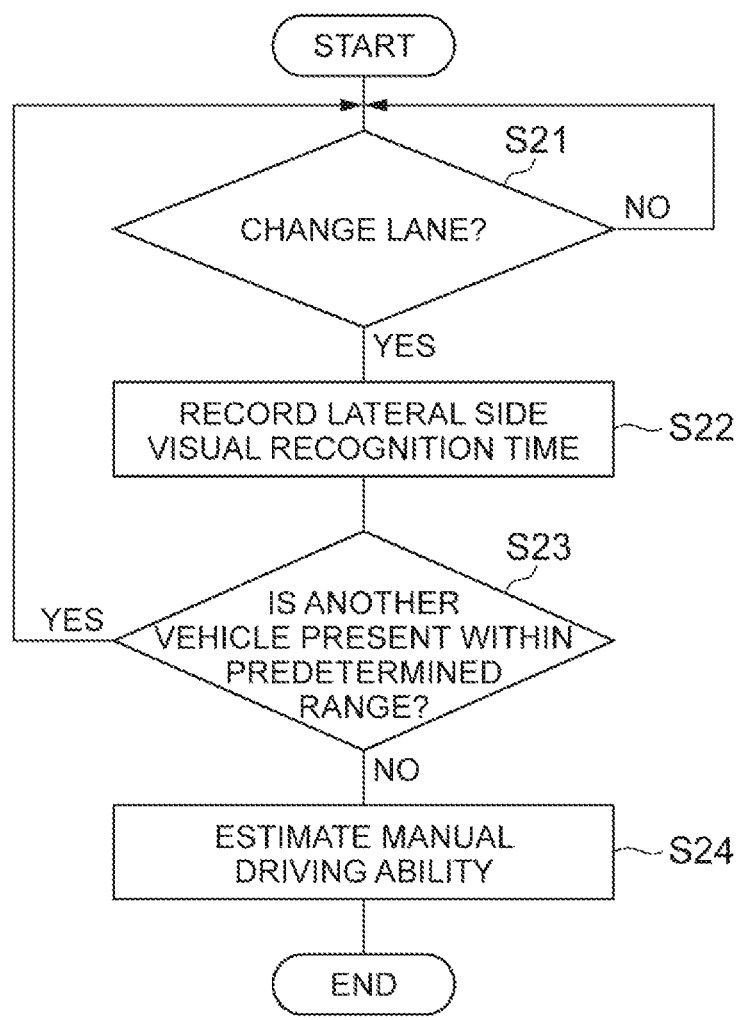
FIG. 9 is a flowchart illustrating another example of processing by the manual driving ability estimation unit in FIG. 1.

Alternatively, as illustrated in FIG. 9 whether or not the host vehicle 50 changes the lane is determined based on the travel state and the traveling environment of the host vehicle 50 (STEP S21). If YES in STEP S21 above, the driver's lateral side visual recognition time is recorded (STEP S22). Whether or not another vehicle is present within a predetermined range around the host vehicle 50 is determined based on the traveling environment of the host vehicle 50 (STEP S23). The predetermined range is, for example, a range from the host vehicle 50 on the lane side where the lane is to be changed to a predetermined distance behind. The predetermined range may be detected by a BSM (Blind Spot Monitor). If NO in STEP S23 above, the manual driving ability is estimated from the recorded lateral side visual recognition time (STEP S24). If NO in STEP S21 above or if YES in STEP S23 above, the process returns to STEP S21.

As described above, the driving consciousness estimation device 100 calculates the driving readiness degree based on the manual driving ability of the driver. Therefore, compared to the related art, the driving readiness degree can be calculated while, for example, taking the individual differences caused by the driver's manual driving ability, and the variations within a day due to the condition relating to the manual driving ability (intelligence of a head, fatigue of the hands, and the like) into consideration. Therefore, the driving readiness degree can be calculated with high accuracy.

In the driving consciousness estimation device 100, the manual driving ability estimation unit 12 may estimate the manual driving ability based on the driver's lateral side visual recognition time at the time of lane change or at the time of entering a merging point. In this case, the driving readiness degree can be calculated based on the spatial cognitive ability among the manual driving abilities of the driver.

At this time, in the driving consciousness estimation device 100, the manual driving ability estimation unit 12 may estimate the manual driving ability when another vehicle is not present within a predetermined range around the host vehicle 50. As a result, it is possible to prevent the erroneous estimation of the manual driving ability, which is caused by the extension of the lateral side visual recognition time due to the presence of another vehicle (for example, in order to determine whether to change the lane while estimating the distance to the other vehicle). It is possible to prevent that the lateral side visual recognition time is erroneously determined to be long and to prevent that the manual driving ability is underestimated.

In the driving consciousness estimation device 100, the manual driving ability estimation unit 12 may estimate the manual driving ability based on the vehicle-to-vehicle distance from the preceding vehicle and the driver's inattention time during the follow-up traveling. In the case, the driving readiness degree can be calculated particularly based on the spatial attention ability among the driver's manual driving abilities.

In the driving consciousness estimation device 100, the manual driving ability estimation unit 12 may estimate the manual driving ability based on the position of the line of sight of the driver when entering a curve. In this case, the driving readiness degree can be calculated particularly based on the action planning ability among the manual driving abilities of the driver.

In the driving consciousness estimation device 100, the manual driving ability estimation unit 12 may estimate the manual driving ability based on the steering amount and the vehicle speed of the host vehicle 50 when passing the lateral side of the obstacle. In this case, the driving readiness degree can be calculated particularly based on the determination ability (action selection ability) among the manual driving abilities of the driver.

In the driving consciousness estimation device 100, the manual driving ability estimation unit 12 may estimate the manual driving ability based on the maximum acceleration and the maximum jerk of the host vehicle 50 during curve driving or braking. In this case, the driving readiness degree can be calculated particularly based on the operation ability among the manual driving abilities of the driver.

The driving consciousness estimation device 100 includes the task demand estimation unit 14 that estimates the task demand, the manual driving suitability determination unit 15 that determines whether the driver's preparation for switching to the manual driving based on the task demand and driving readiness degree is suitable or not. As a result, it is possible to determine whether the preparation for switching to manual driving is suitable or not with high accuracy by using the task demand and the driving readiness degree.

In the driving consciousness estimation device 100, the HMI 6 applies stimulation to the driver when it is determined by the manual driving ability estimation unit 12 that the preparation for switching to manual driving is not suitable. As a result, when it is determined that the driver's preparation for switching to manual driving is not suitable, it is possible to encourage the driver to increase the driving readiness degree.

In the driving consciousness estimation device 100, the HMI 6 displays the result of determination performed by the manual driving suitability determination unit 15. As a result, it is possible to feed back the result of determination of the suitability for the preparation for switching to manual driving to the driver or the like.

In the driving consciousness estimation device 100, during the manual driving of the host vehicle 50, the manual driving ability estimation unit 12 estimates the manual driving ability of the driver. As a result, it is possible to estimate the manual driving ability with high accuracy.

In the driving consciousness estimation device 100, during the autonomous driving of the host vehicle 50, the driver state estimation unit 11 estimates the state of the driver and the driving readiness degree calculation unit 13 calculates the driving readiness degree. As a result, the state of the driver and the driving readiness degree obtained during the autonomous driving can be used for determining whether the preparation for switching to manual driving is suitable or not, which is continued from the autonomous driving.

As described above, the embodiment according to an aspect of the present disclosure was described above, an aspect of the present disclosure is not limited to the above-described embodiment. An aspect of the present disclosure can be implemented in various forms including various modifications and improvements based on the knowledge of those skilled in the art, including the above-described embodiment.

In the embodiment described above, it is not always necessary to be connected to the autonomous driving ECU 7, and it is not necessary to configure a part of the autonomous driving system. An aspect of the present disclosure can also be applied to the host vehicles that do not perform autonomous driving. In the embodiment described above, the driving readiness degree is estimated using the tables set in advance, but the driving readiness degree may be estimated using calculation formula set in advance. In the embodiment described above, the driving consciousness estimation device 100 may configure a part of an autonomous driving system that performs the autonomous driving of the host vehicle 50.

What is claimed is:

1. A driving consciousness estimation device comprising:
 a driver state estimation unit configured to estimate a state of a driver of a host vehicle;
 a manual driving ability estimation unit configured to estimate a manual driving ability of the driver based on at least one of a travel state of the host vehicle, a traveling environment around the host vehicle, and a reaction of the driver; and
 a driving readiness degree calculation unit configured to calculate a driving readiness relating to a driving consciousness of the driver based on the state of the driver and the manual driving ability of the driver.

2. The driving consciousness estimation device according to claim 1,
 wherein the manual driving ability estimation unit is configured to estimate the manual driving ability based on a driver's lateral side visual recognition time when changing lanes or entering a merging point.

3. The driving consciousness estimation device according to claim 2,
 wherein the manual driving ability estimation unit is configured to estimate the manual driving ability when another vehicle is not present within a predetermined range around the host vehicle.

4. The driving consciousness estimation device according to claim 1,
 wherein the manual driving ability estimation unit is configured to estimate the manual driving ability based on a distance from a preceding vehicle and a driver's inattention time during follow-up driving.

5. The driving consciousness estimation device according to claim 1,
 wherein the manual driving ability estimation unit is configured to estimate the manual driving ability based on a position of a line of sight of the driver when entering a curve.

6. The driving consciousness estimation device according to claim 1,
 wherein the manual driving ability estimation unit is configured to estimate the manual driving ability based on a steering amount and a vehicle speed of the host vehicle when passing a lateral side of an obstacle.

7. The driving consciousness estimation device according to claim 1,
 wherein the manual driving ability estimation unit is configured to estimate the manual driving ability based on a maximum acceleration and a maximum jerk of the host vehicle when curve driving or braking.

8. The driving consciousness estimation device according to claim 1, further comprising:
 a task demand estimation unit configured to estimate a task demand, which is an indicator required for the driver of the host vehicle; and
 a manual driving suitability determination unit configured to determine whether a driver's preparation for switching to the manual driving is suitable or not based on the task demand and the driving readiness.

9. The driving consciousness estimation device according to claim 8, further comprising:
 a stimulus applying unit configured to apply a stimulus to the driver when it is determined that the preparation for switching to the manual driving is not suitable by the manual driving suitability determination unit.

10. The driving consciousness estimation device according to claim 8, further comprising:
 a display unit configured to display a result of the determination performed by the manual driving suitability determination unit.

11. The driving consciousness estimation device according to claim 1, wherein the manual driving ability estimation unit is configured to estimate the manual driving ability during the manual driving of the host vehicle.

12. The driving consciousness estimation device according to claim 1,
wherein the driver state estimation unit is configured to estimate the state of the driver and the driving readiness calculation unit is configured to calculate the driving readiness during an autonomous driving of the host vehicle.

* * * * *